(12) United States Patent
Wells et al.

(10) Patent No.: US 9,199,376 B2
(45) Date of Patent: Dec. 1, 2015

(54) INTUITIVE GRASP CONTROL OF A MULTI-AXIS ROBOTIC GRIPPER

(71) Applicant: GM GLOBAL TECHNOLOGY OPERATIONS LLC, Detroit, MI (US)

(72) Inventors: James W. Wells, Rochester Hills, MI (US); Roland J. Menassa, Macomb, MI (US); Omer Einav, Moshaw Kfar Monash (IL); Noam Perlis, Kibutz Yagur (IL)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 13/802,972

(22) Filed: Mar. 14, 2013

(65) Prior Publication Data

US 2014/0277742 A1 Sep. 18, 2014

(51) Int. Cl.
*B25J 9/16* (2006.01)
*B25J 15/00* (2006.01)

(52) U.S. Cl.
CPC ............ *B25J 9/1612* (2013.01); *B25J 15/0009* (2013.01); *G05B 2219/40099* (2013.01)

(58) Field of Classification Search
CPC ........ B25J 15/0009; B25J 11/05; B25J 11/13; B25J 15/08; B25J 19/02; B25J 9/1612; G05B 2219/40099
USPC ......................................... 700/214, 245, 261
See application file for complete search history.

(56) References Cited

U.S. PATENT DOCUMENTS

| | | | |
|---|---|---|---|
| 5,325,468 A * | 6/1994 | Terasaki et al. ............... | 700/262 |
| 6,088,628 A * | 7/2000 | Watanabe et al. ............. | 700/264 |
| 7,164,971 B2 | 1/2007 | Ferla et al. | |
| 7,350,158 B2 * | 3/2008 | Yamaguchi et al. .......... | 715/834 |
| 8,050,782 B2 * | 11/2011 | Fallman et al. ................. | 700/83 |
| 2001/0045809 A1 * | 11/2001 | Mukai ...................... | 318/568.22 |
| 2005/0240309 A1 * | 10/2005 | Bischoff ....................... | 700/245 |
| 2009/0300531 A1 * | 12/2009 | Pryor ............................ | 715/764 |
| 2010/0145518 A1 * | 6/2010 | Kim ............................. | 700/258 |
| 2011/0252896 A1 * | 10/2011 | Kishida et al. ............ | 73/862.621 |
| 2012/0072022 A1 * | 3/2012 | Kim et al. ..................... | 700/255 |
| 2012/0095619 A1 * | 4/2012 | Pack et al. ......................... | 701/2 |

(Continued)

FOREIGN PATENT DOCUMENTS

| | | |
|---|---|---|
| DE | 102010039540 A1 | 2/2012 |
| DE | 102012103032 | 7/2013 |

(Continued)

*Primary Examiner* — Jerrah Edwards
*Assistant Examiner* — Tamara Weber
(74) *Attorney, Agent, or Firm* — Quinn Law Group, PLLC (57) ABSTRACT

A system includes a robotic gripper and a grasp controller. The gripper, which has a sensory matrix that includes a plurality of sensors, executes selected grasp poses with respect to a component in the corresponding method to thereby grasp the component in response to a grasp command signal from the controller. The controller has a touch-screen or other interactive graphical user interface (GUI) which generates a jog signal in response to an input from a user. Sensory maps provide calibrated limits for each sensor contained in the sensory matrix for the selected grasp pose. The controller transmits the grasp command signal to the gripper in response to receipt of the jog signal from the GUI. The GUI may display a jog wheel having icons, including a hub corresponding to a neutral pose of the robotic gripper and icons corresponding to grasp poses arranged around a circumference of the jog wheel.

19 Claims, 4 Drawing Sheets

(56) References Cited

U.S. PATENT DOCUMENTS

| | | |
|---|---|---|
| 2012/0173021 A1* | 7/2012 | Tsusaka .................. 700/258 |
| 2012/0191269 A1* | 7/2012 | Chen et al. ................ 701/2 |
| 2012/0296472 A1* | 11/2012 | Nagai .................... 700/258 |

FOREIGN PATENT DOCUMENTS

| | | |
|---|---|---|
| EP | 1048995 A2 | 11/2000 |
| JP | H06210582 A | 8/1994 |
| JP | 2010182235 A | 8/2010 |

* cited by examiner

INTUITIVE GRASP CONTROL OF A MULTI-AXIS ROBOTIC GRIPPER

TECHNICAL FIELD

The present disclosure relates to a system and method for intuitively controlling a grasp of a multi-axis robotic gripper.

BACKGROUND

Robots are automated devices which are able to act on or manipulate objects using a series of links. The links are interconnected via articulations and actuator-driven robotic joints. End-effectors are the particular links or connected devices used for performing a work task. For instance, in a robotic gripper, which is typically a hand having two or more articulated fingers, the task of grasping an object is performed via a controlled movement of the links arranged in a chain extending from the base of the robotic gripper to the tips of the fingers.

Robotic grippers are available in a wide range of geometric sizes, grasping force capabilities, degrees of freedom, and relative dexterities. Some gripper designs use two relatively rigid pinchers to grasp a simple object via a pinching motion. Others use a five-finger humanoid hand with articulated fingers to grasp an object in a variety of grasp poses, with the particular grasp pose determined by the geometry of the object being grasped. Given the vast range of possible grasp poses, object geometries, and robotic gripper designs, conventional control methods and systems for executing a commanded grasp pose by a multi-axis robotic gripper are less than optimal in certain applications.

SUMMARY

A system and corresponding method are disclosed herein that provide intuitive, high-level control over jogging, positioning, troubleshooting, and programming of a multi-axis robotic gripper in the execution of a commanded grasp pose. Expedited grasp pose configuration may be of particular benefit in the grasp control of relatively complex dexterous robotic grippers, particularly in the execution of relatively unstructured tasks such as bin picking, material handling, and part placement or assembly.

Robotic grippers are conventionally programmed via time-intensive individual axis-and-sensor programming methods, wherein each sub-motion and related sensor interaction is explicitly defined in computer-executable software code. The approach disclosed herein departs from this current state of the art by intuitively depicting and allowing selection of a desired grasp pose via a device, e.g., an interactive graphical user interface (GUI) and associated logic hardware and software modules, possibly including a touch screen device. The GUI could be located on a teach pendant, a control panel, or a wireless device. Regardless of its configuration, the GUI provides suitable means for instructing the robotic gripper, with each grasp pose having a corresponding sensory map. The sensory maps provide a generic way to perform and program different families of grasping tasks.

In particular, a system as disclosed herein includes a robotic gripper and a controller. The robotic gripper, which includes a sensory matrix, is configured to execute a grasp pose to thereby grasp a component in response to a grasp command signal. The controller is in communication with the robotic gripper, and includes an interactive GUI having a touch-screen or other combination of a display and pointing device, as well as memory and a processor. The GUI, when in a manual or programming mode, generates a jog signal in response to an input from a user, e.g., a touch motion, mouse input, or software signal, while one or more sensory maps recorded in memory provide calibrated limits for the grasp pose for each sensor contained in the sensory matrix. The controller moves the robotic gripper into the grasp pose in response to the jog signal based on the user intention as provided via the GUI, or based on a user program.

Each of the grasp poses may have a corresponding sensory map. The robotic gripper may have at least one finger, or a finger and at least one opposable thumb. Four articulated fingers and a palm may be used in an example humanoid embodiment, with the sensory matrix including sensors positioned on each of the fingers, the thumb, and the palm. The sensory matrix may include object presence, force or load sensors, a weight sensor, and/or a heat sensor. The interactive GUI may display a jog wheel having icons, including a hub corresponding to a neutral pose of the robotic gripper and icons for associated grasp poses arranged around a circumference of the jog wheel. This display may dynamically indicate the present status of the gripper when executing a task in automatic mode or when paused during an operation for the purposes on trouble shooting the state of operation, grasp pose, or sensor matrix state. Additionally, the grasp controller may execute a "teach mode" wherein the sensory matrix is populated via values derived by recording or taking a "snapshot" of the actual sensor matrix data observed during manually jogging to a pose or backdriving the robotic gripper into a desired pose.

A method is also disclosed for controlling a robotic gripper, in a manual or a teach mode, having a sensory matrix that includes a plurality of sensors. The method includes generating a jog signal via an interactive GUI using an intention motion, e.g., a touch screen gesture from a user, and receiving the jog signal via a grasp controller. The method also includes generating a grasp command signal via the grasp controller in response to the jog signal and then executing a selected one of a plurality of grasp poses via the robotic gripper with respect to a component in response to the grasp command signal.

Additionally, the method may include receiving feedback signals from the sensory matrix during execution of the selected grasp pose, comparing the received feedback signals to a corresponding sensory map which provides calibrated limits for each sensor contained in the sensory matrix for the selected grasp pose, and executing a control action with respect to the robotic gripper when any of the received feedback signals fall outside of their corresponding calibrated limits. To facilitate annunciation of "out of limits" conditions, the feedback signals or other data can be highlighted in the display of the sensory map by changing colors or other graphical techniques such that a user's attention is drawn to the condition. In a possible embodiment, a specified program(s) may be executed while such indication is provided to the user.

The above features and advantages and other features and advantages of the present invention are readily apparent from the following detailed description of the best modes for carrying out the invention when taken in connection with the accompanying drawings.

DETAILED DESCRIPTION

Figures 1, 2:
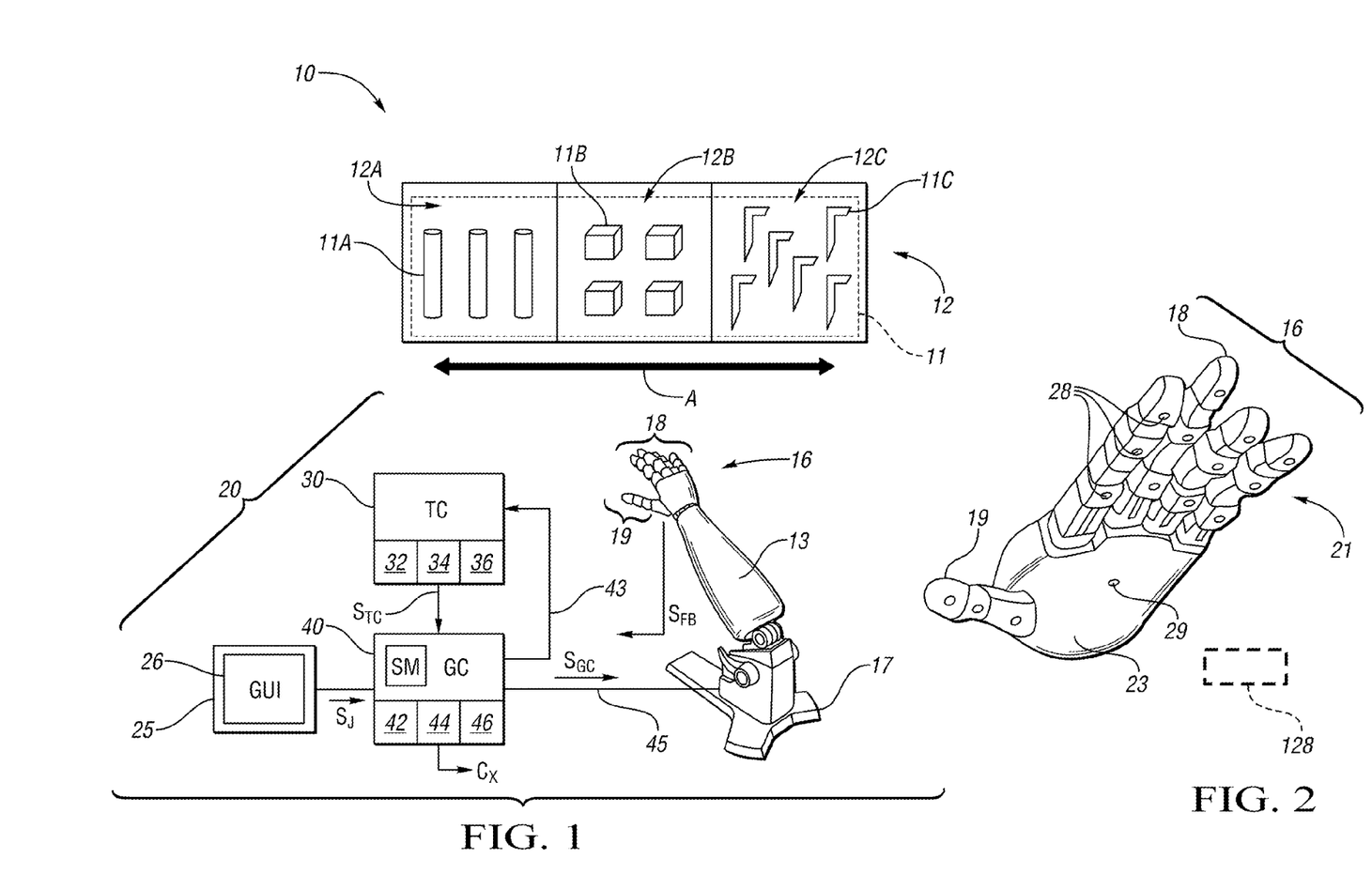
FIG. 1 is a schematic illustration of a system having a controller and a multi-axis robotic gripper, with grasp pose control of the robotic gripper executed via the controller as set forth herein.
FIG. 2 is a schematic perspective view illustration of a dexterous robotic gripper usable within the system of FIG. 1.

With reference to the drawings, wherein like reference numbers refer to the same or similar components throughout the several views, FIG. 1 shows a work space 10 having a system 20. The system 20 includes a multi-axis robotic gripper 16 and a grasp controller (GC) 40, with the latter including an interactive graphical user interface (GUI) 25. The GUI 25 may be a touch screen device, whether as a full screen device, a teach pendant, a control panel, or a wireless device. In lieu of a touch screen, the means for the interaction with a user could be a pointing device or a set of function buttons on the device, with a user signaling his or her intention for a given grasp and viewing the result on the GUI 25. The GUI 25 as set forth herein thus acts as an input or command device, as well as a status monitoring, maintenance, and troubleshooting device when in those particular modes.

The grasp controller 40 controls the execution by the robotic gripper 16 of a commanded grasp pose. In the example shown in FIG. 1, the robotic gripper 16 is configured as a dexterous humanoid robot hand having four articulated fingers 18 and an opposable thumb 19. In other embodiments, more or fewer active or passive fingers 18 and/or no thumb 19 may be used without departing from the intended inventive scope.

The robotic gripper 16 may be connected to a base 17, e.g., via an arm 13 as shown. The robotic gripper 16 moves with respect to the base 17, which may be either fixed or mobile, in response to grasp commands (arrow $S_{GC}$) transmitted by the grasp controller 40. Sensory feedback data (arrow $S_{FB}$) is fed from the robotic gripper 16, and/or optionally from external sensors 128 as shown in FIG. 2, to the grasp controller 40 and thereafter used as set forth below with reference to FIGS. 2-6.

In a typical application, the robotic gripper 16 may be used on a plant floor in a material handling, bin picking, and/or assembly process. In such a process, the robotic gripper 16 may be commanded to move with respect to a rack 12 as indicated by double-headed arrow A, select a component 11 from the rack 12, grasp the component in a command grasp pose, and then transport the grasped component 11 to a particular location, e.g., for part placement, assembly, or packaging. To facilitate automatic picking, the rack 12 may be divided into different bins 12A, 12B, 12C, with each of the bins 12A-C potentially containing a unique part or component 11. These are respectively represented in FIG. 1 as components 11A, 11B, and 11C. More or fewer bins 12 may be used depending on the application.

The relative geometry of each of the components 11A, 11B, and 11C may differ. The differences in geometry, for instance in the size, shape, or contour, as well as the relative weight or composition, may require a different grasp pose. Also, even within a given bin 12A, 12B, or 12C the orientation of the corresponding component 11A, 11B, or 11C with respect to the robotic gripper 16 may differ from an expected orientation. For instance, the component 11A may be lying on its side in bin 12A instead of upright as shown. All of the foregoing may require execution of a different grasp pose by the robotic gripper 16, with adjustments sometimes being necessary in real time. Thus, regardless of the number of degrees of freedom provided by the robotic gripper 16, commanding of movement into an appropriate grasp pose provides a unique control problem. The present control system 20 is therefore intended to solve such a problem while vastly simplifying the interface presented to a user relative to conventional control methods.

Figure 4:
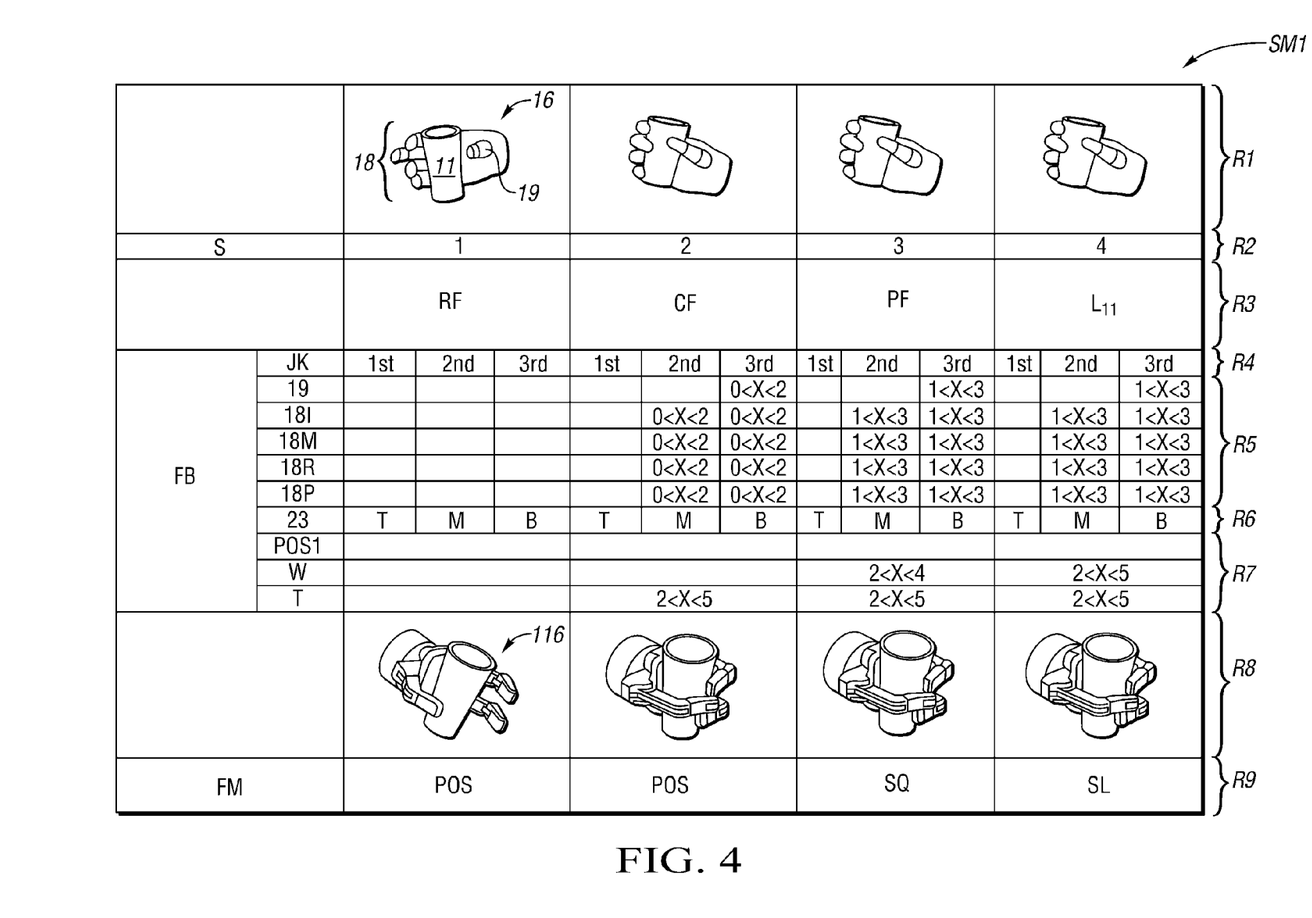
FIG. 4 is a schematic sensory map for one possible grasp pose.
Figure 5:
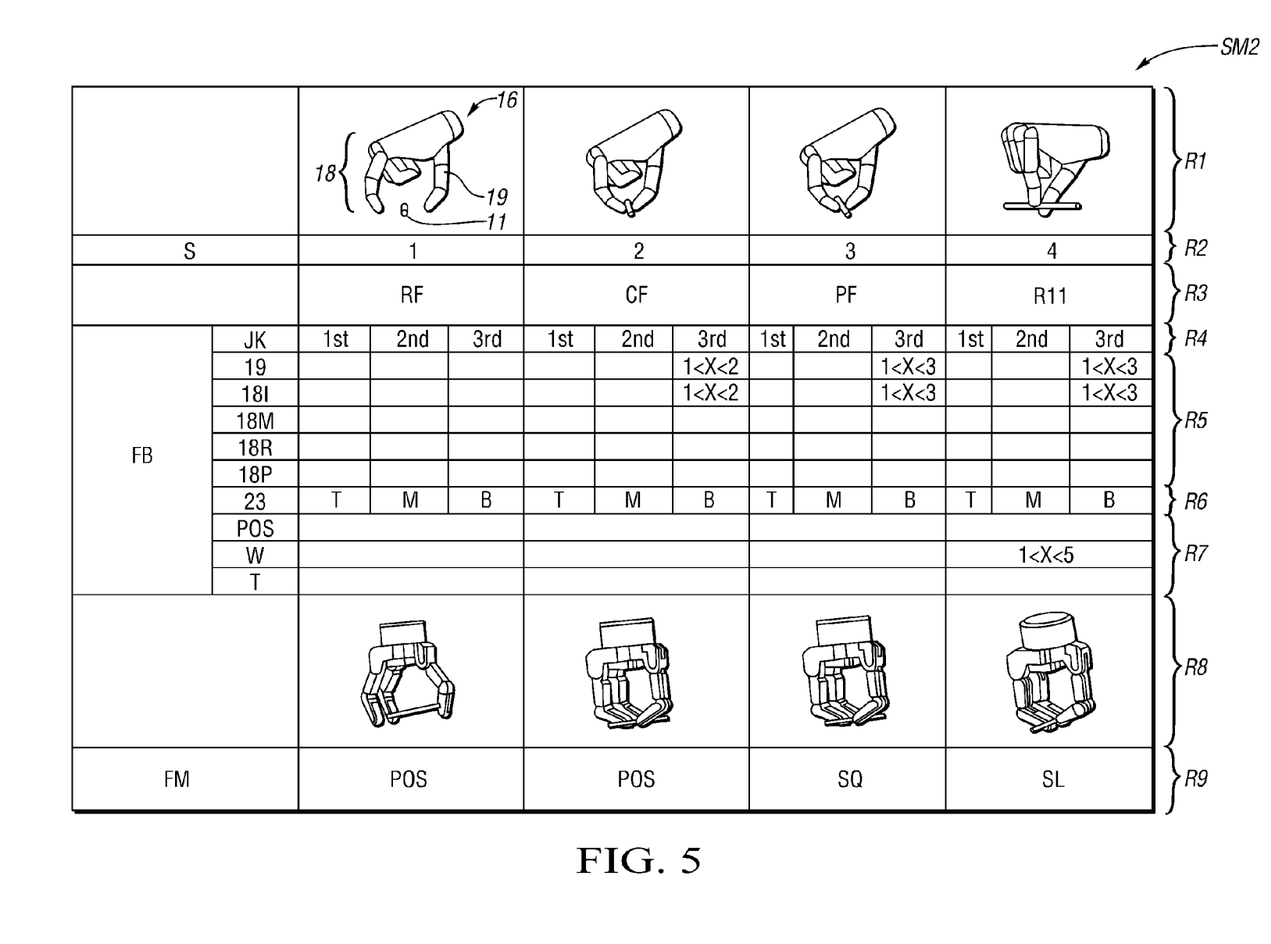
FIG. 5 is a schematic sensory map for another possible grasp pose.

The robotic gripper 16 of FIG. 1 may be used in conjunction with a sensory matrix 21, an example of which is shown in FIG. 2 and explained below with reference to that Figure. In a particular embodiment, the GUI 25 displays what is referred to hereinafter as a jog map 26, the details of which are described in more detail below with reference to FIG. 3. FIGS. 4-5 describe sensory matrices SM1 and SM2 for two example grasp poses, with these sensory matrices labeled generally as SM in FIG. 1. The format of the sensory matrices may be scaled to the number of different sensing elements in the sensory matrix. The sensory matrices are used as set forth below with reference to FIGS. 4-5 as well as the method 100 of FIG. 6.

With respect to the robotic gripper 16 of FIG. 1, in a possible configuration grasp task planning may occur at a top level via a task controller (TC) 30, which may receive feedback (arrow 43) as needed from the grasp controller 40 during execution of a task, e.g., to determine precisely where the robotic gripper 16 is in a given task. The task controller 30 may or may not be part of the system 20. A given task sequence may be commanded at this upper level of control as a task command (arrow $S_{TC}$), such as "retrieve component 11A from bin 12A and deliver it to pallet B for shipping". The grasp controller 40 receives the task command (arrow $S_{TC}$), with a user of the grasp controller 40 accessing a corresponding sensory map (SM) via the GUI 25. The GUI 25 may thereafter display the jog map 26 such that the user can easily plan and control the manual or automatic execution of the required grasp pose. The sensory feedback signals (arrow $S_{FB}$) from the grasp controller 40 may be provided to the task controller 30 as needed to communicate information such as real-time status updates.

The task controller 30 and the grasp controller 40 shown in FIG. 1 may be embodied as computer devices having any required hardware and software elements such as a respective processors 32, 42, tangible, non-transitory memory 34, 44, e.g., ROM, optical media, flash memory, etc., as well as any required transitory memory such as RAM and EEPROM. The respective task and grasp controllers 30 and 40 may include all necessary input/output (I/O) devices, transceivers 36, 46, and the like. Grasp command signals (arrow $S_{GC}$) from the grasp controller 40 are transmitted to the robotic gripper 16 via a suitable control link 45, e.g., a controller area network (CAN) bus, serial connection, or wirelessly. Ultimately, the grasp controller 40 outputs a control signal (arrow $C_X$) to one or more devices, possibly including memory 44 or an external indicator (not shown), when executing a control action with respect to the robotic gripper 16, as discussed below with reference to step 110 of FIG. 6.

Referring to FIG. 2, the robotic gripper 16 of FIG. 1 includes the sensory matrix 21 noted briefly above. The sensory matrix 21 includes multiple sensors 28, 29 which may be connected to or embedded in the structure of the robotic gripper 16, e.g., in or on the various fingers 18, the thumb 19, and a palm 23. Optionally, one or more external sensors 128 may be used as part of the sensory matrix 21, for instance a vision system, an electro-optical or infrared camera, or another remote sensor(s). The sensors 28, 29 may include touch/tactile sensors, force and/or torque sensors, surface pressure sensors, thermal/infrared sensors, and the like. Other sensors (not shown) mounted in the structure of the robotic gripper 16 may provide information regarding digit location in Cartesian space, joint torque, motor current, voltage, or impedance for any motor-driven joints, speeds, and the like. The sensory map (SM) shown schematically in FIG. 1 describes the particular configuration and desired settings of the various parameters which represent the progression of a grasp and the states of the sensory matrix 21 for the eventual execution of a specific grasp pose. The feedback from the external sensors 128 may be likewise compared to expected limits.

Figure 3:
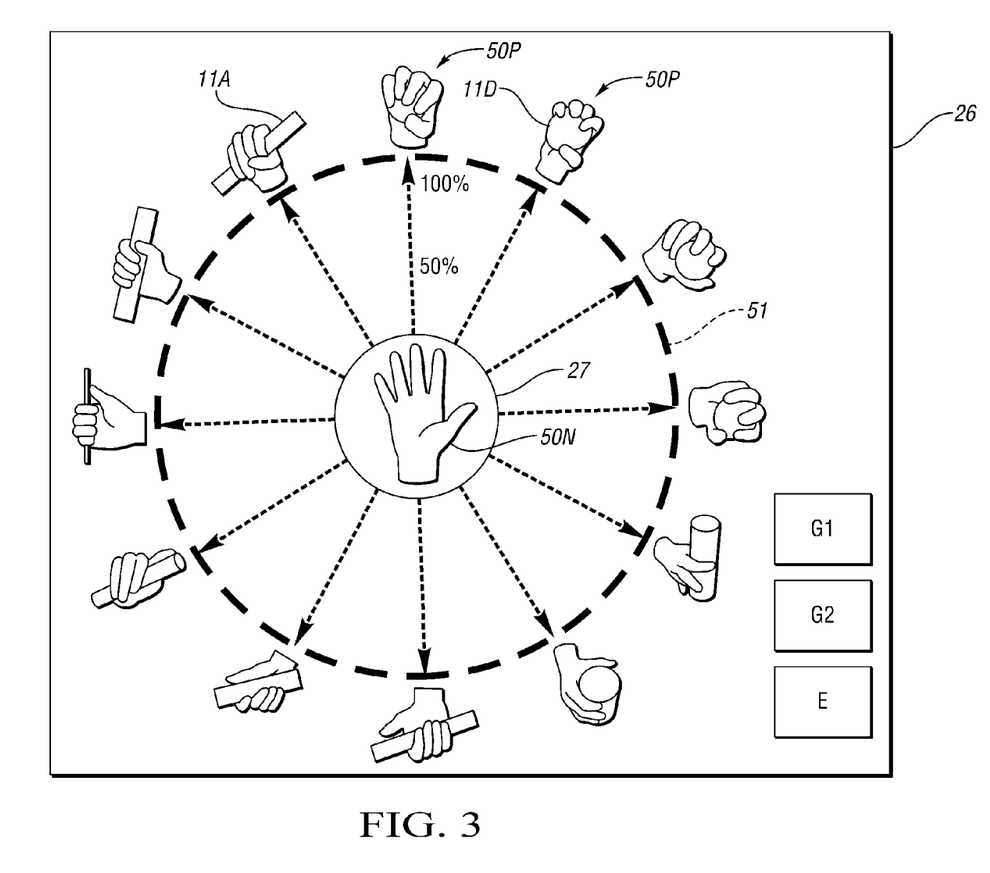
FIG. 3 is a schematic illustration of a grasp wheel which may be displayed to a user via the GUI shown in FIG. 1.

Referring to FIG. 3, once the grasp controller 40 of FIG. 1 has received the task command (arrow $S_{TC}$) from the task controller 30, e.g., in an automatic mode, the desired grasp pose for executing the commanded task may be intuitively planned by a user via the jog map 26. When in a manual mode or in a "teach" mode, the user may set up a desired task and the grasp pose may be commanded by the user, also intuitively via input to the jog map 26. In other embodiments, selection of the grasp pose could be performed in software, i.e., without input from the user. For instance, the appropriate grasp pose could be from the component 11 itself, for example via a grasping taxonomy and/or known geometry of the robotic gripper 16.

An example jog map 26 is shown in FIG. 3 having a jog wheel 51, with the number and type of grasp poses 50P of FIG. 3 arranged around the circumference of the jog wheel 51 showing a non-limiting example of just one of many possible configurations. Multiple types of components may be displayed on the jog wheel 51, e.g., the component 11A of FIG. 1, shown as an example cylinder, and a spherical component 11D. As with the number of grasp poses 50P, the number and type of components that are displayed about the circumference of the jog wheel 51 is likewise not limited to the embodiment of FIG. 3. The particular grasp poses 50P that would be shown via the jog wheel 51 in practice could correspond to the particular components arranged in the rack 12 of FIG. 1.

Depending on the number of different components and grasp types used to implement a particular process, there may be several layers or pages of jog screens in a given jog map 26 that collectively group the different range of grasp types for each component 11. This scheme can expand as needed to make the jog wheel(s) 51 easy to interact with, and to provide a natural grouping of grasp types relevant to the desired tasks. Based on the geometry of the component 11 being grasped, various grasp types may be presented while others may be excluded. An optional program or logic may be used to automatically indentify a correct grasp type and pose based on the component 11. A similar program could also be used in the automatic mode noted above.

The example jog map 26 of FIG. 3 may provide an intuitive touch-screen interface or other suitable interactive interface for simplified jog planning of a desired grasp type. There are various ways a robot may grasp an object. The range of grasp poses 50P displayed would thus depend on the design of the robotic gripper 16, such as the number of fingers 18 it has, whether or not the gripper 16 has a thumb, and so on. Additional grasp menus G1 and G2 may be displayed alongside the jog wheel 51 to allow a user to select other possible grasp poses, and thus the grasp controller 40 of FIG. 1 may be configured as needed to conform to the particular task at hand. Additionally, an edit (E) button may be displayed for editing of the various sensory maps (SM) of FIG. 1, as described below with reference to FIGS. 4-5.

At a hub 27 of the jog wheel 51 lies what is referred to herein as a neutral pose 50N, e.g., an open hand or the most likely starting or ending pose of a particular robotic gripper 16 for the particular set of grasp poses 50P being displayed. A user may simply slide a finger from the hub 27 to the desired grasp pose 50P to thereby generate a corresponding proportional jog signal (arrow $S_J$) to manually initiate execution of the selected grasp pose 50P. Internal logic of the GUI 25 and/or grasp controller 40 translates the touch-screen contact, pointing device activation, and/or motion, into a corresponding trajectory, all of which is encoded in the jog signal (arrow $S_J$). The grasp controller 40 then matches the jog signal (arrow $S_J$) to the selected grasp pose 50P.

Top-level grasp path planning underlying each of the grasp poses 50P may be performed in a variety of different ways, as is well known in the art. Each grasp pose 50P thus has a corresponding grasping path encoded in memory 44 of the grasp planner 40. Any conventional grasp path planning techniques that are used, however, must result in execution of the indicated grasp pose 50P that is ultimately selected. Sliding of the user's finger or otherwise indicating intention on the jog map 26 thus commands the grasp controller 40 to move or "jog" the robotic gripper 16 from its last known position to a neutral pose 50N, and then progressively moves the active links of the robotic gripper 16 toward the requested grasp pose 50P, with the relative progression shown in FIG. 3 as 50% (half complete) and 100% (complete) on the radial from the neutral pose (50N) to the completed grasp.

Each grasp pose 50P of the displayed jog wheel 51 shown in FIG. 3 corresponds to a particular sensory map, i.e., the sensory map (SM) shown in FIG. 1. A corresponding sensory map is assigned to each grasp pose 50P as a set of calibrated ranges or limits. In a possible embodiment, selecting a particular grasp pose 50P, e.g., by double-clicking on a corresponding icon representing the grasp pose 50P, opens the underlying sensory map for that grasp pose. Default sensory maps may be recorded for each standard grasp type, for instance power, intermediate, and precision grasps, as well as other configurations relevant to the particular design of the robotic gripper 16 being used. "Taught" grasps and their respective linked sensory maps may appear on a set of screens reserved for programmed tasks in addition to preloaded set of default grasp poses 50P.

Optionally, the grasp controller 40 of FIG. 1 may automatically blend adjacent grasp poses 50P, for instance when a user slides a finger or otherwise indicates selection between adjacent grasp poses 50P as opposed to taking a direct linear route from the neutral pose 50N to a specific one of the grasp poses 50P. The jog map 26 of FIG. 3 thus provides both detailed single link control and access to corresponding sensory maps for each possible grasp pose 50P to allow any obtainable configuration of the robotic gripper 16 to be programmed for future use.

Referring to FIG. 4, a possible first sensory map SM1 having rows R1-R9 is shown for an example grasp pose, shown here as a multi-fingered "power grasp" of a tube-shaped component in row R1. The sensory map SM1 provides a data table representation of the commanded grasp pose with associated ranges or limits for the various sensors that make up the sensory matrix 21 shown in FIG. 2. The sensory map SM1 forms a data structure and visualization tool for different state configurations and views of the robotic gripper 16, its sensor status, and also grasp confirmation information. As shown in row R2, the commanded grasp pose progresses in steps (S) 1-4 from an open or ready fingers (RF) at step 1, closing the fingers (CF) onto the component 11 (step 2), pressing the fingers (PF) on the grasped component (step 3), and then lifting the component ($L_{11}$) at step 4, with the various actions shown in row R3.

Feedback (FB) of the sensory map SM1 is shown in rows R4-R7. Row R4 lists the particular joints (J) of each identified finger 18 or thumb 19 of rows R5. 18I, 18M, 18R, and 18P correspond to the index, middle, ring, and pinky fingers 18 of the robotic gripper 16. Any non jointed structure of the robotic gripper 26 such as the palm 23 of FIG. 2 may be identified in row R6. Additional parameters such as position (POS), weight (W), heat, temperature (T), and/or other sensory data may be identified in rows R7.

With respect to rows R4, a user may program the limits for each joint, for instance as force limits. In the ready position of step 1, for instance, no force measurements should be present as the robotic gripper 16 is not in contact with the component 11. At the close position of step 2, force may be set to a calibrated range as shown, with all force provided only at the $2^{nd}$ and $3^{rd}$ joints of the thumb and fingers. No readings are provided for the top, middle, or bottom of the palm for this grasp. In the close step, i.e., step 2, heat should be measured in the indicated range. As the robotic gripper 16 squeezes or presses on the component 11 in step 3, the allowable force readings increase, and the weight should now be sensed along with heat. The weight value may increase slightly as the component 11 is lifted.

Simulation positions are shown in row R8 for another type of robotic gripper 116, i.e., a three-fingered gripper as shown, to describe some of the possible failure modes (FM) of row R9 that might be encountered during grasp simulation. For instance, in step 1, contact between the robotic gripper 116 and the component 11 may be caused by position errors (POS). Such information could be used to help train the robotic gripper 116, for instance using a teach module as noted below. Other errors in position could result during steps 2 and 3 as too little or too much force is applied by the robotic gripper as it squeezes (SQ) too hard, or perhaps not enough force such that the component 11 slips (SL). These fault modes may be detected relative to the limits set in the sensory map SM1, e.g., slippage of the component in step 4 as shown in row R9. Out of limit conditions may be highlighted graphically so the condition can be easily recognized among the many possible parameters in play at any given time.

Another example sensory map SM2 is shown in FIG. 5 for a precision grasp, shown here as a pinching grasp of a cylindrical component 11A such as a pencil. As with the example of FIG. 4, the sensory map SM 2 is populated with limits for each of the sensors in the sensory matrix 21 shown in FIG. 2.

Optionally, the feedback limits shown in rows R4-R7 of FIGS. 4 and 5 may be determined via execution of a "teach" mode, wherein the robotic gripper 116 used in simulation, or alternatively a touch-sensitive glove equipped with the same sensor, may be manually jogged, backdriven, or otherwise set into various grasp poses to learn the appropriate limits of the sensory response and/or to refine grasp positions. For example, the robotic gripper 116 may be grasping a component 11 for the very first time, and thus the robotic gripper 116 has no prior experience with the component 11. In a teach mode, one could command a grasp with a nominal amount of force and then verify which sensors "light up" or activate as well as the associated sensor readings. If the grasp is deemed satisfactory by the user, or alternatively by logic or software, that particular grasp with its corresponding sensory map may then be stored for future use. Grasps and/or an expected sensory map could also be downloaded from a CAD-based simulation model in another embodiment. The GUI 25 could be used to switch between modes or for a variety of other functions not explicitly discussed here, as would be understood by one of ordinary skill in the art.

Statistical learning models may be used to optimize both the sensory maps, e.g., SM1 or SM2, and the grasp poses. In this manner, the desired end states and thresholds embodying the sensory maps SM1, SM2 may be "taught" to the robotic gripper 16 and threshold limits set per the learning models as opposed to being arbitrarily set. Such an approach may help reduce the need for later error correction as the actual limits should correspond to those needed for execution of the desired grasp.

Figure 6:
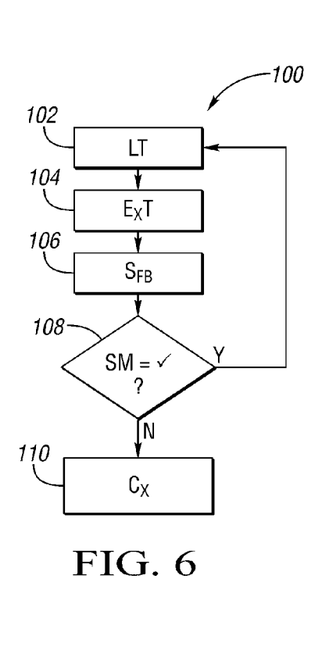
FIG. 6 is a flow chart describing an example method for controlling the robotic gripper within the system shown in FIG. 1.

Referring to FIG. 6, an example method 100 is shown for using the system 20 and robotic gripper 16 of FIG. 1 in the execution of a commanded grasp pose. Unless otherwise specified, each step described below references structure shown in FIG. 1. Step 102 entails loading a commanded task from the task controller 30 into the grasp controller 40, which is abbreviated in FIG. 6 as LT. For instance, this step may include receiving and processing of the grasp commands (arrow $S_{GC}$). The task that is loaded may describe a commanded target component 11, start state, and end state, for instance, "retrieve a component 11A from bin 12A and deposit the component 11A in packaging area X". The commanded task could be part of an automatically executing cycle or generated in response to a receipt of a shipping order in an example warehouse application, or it could be generated in response to a manufacturing order or the like. The method 100 proceeds to step 104 once the task is loaded into memory 44 of the grasp controller 40.

At step 104, the grasp controller 40 executes the commanded task ($E_X T$) in the manner described above. To initiate step 104, e.g., in teach mode, a user may use the GUI 25 to call up a pre-recorded jog wheel 51 as shown in FIG. 3, with the jog wheel 51 corresponding to the grasp to be executed. Depending on the range of the components 11 contained in the bin 12, as well as the degrees of freedom of the robotic gripper 16 being used to execute the grasp, the number of available, pre-programmed jog wheels 51 will vary.

Therefore, the user could touch or otherwise select a displayed menu in a prior screen (not shown) to select the appropriate jog wheel 51 as part of step 104. Thereafter, the user touches the hub 27 of the jog wheel 51 to begin the grasp control process. The same user then slides a finger toward the desired end state, e.g., an appropriate grasp pose 50P as shown in FIG. 3. As the robotic gripper 16 receives this command and begins acting on it, the method 100 proceeds to step 106.

Step 106 entails receiving the sensory feedback signals (arrow $S_{FB}$) from the sensory matrix 21, an example of which is described above with reference to FIG. 2, and temporarily recording the sensory feedback signals (arrow $S_{FB}$) in memory 44. Step 106 continuously executes throughout the duration of execution of the grasp pose, and thus the method 100 proceeds to step 108 while still collecting the sensory feedback signals (arrow $S_{FB}$) from the sensory matrix 21.

At step 108, the grasp controller 40 evaluates the incoming sensory feedback signals (arrow $S_{FB}$) with respect to a corresponding sensory map, e.g., SM1 or SM2 of FIGS. 4 and 5 as described in detail above. Step 108 entails determining, via the processor 42, whether the incoming sensory feedback signals (arrow $S_{FB}$) from the sensory matrix 21 of FIG. 2, or another sensory matrix 21 in other configurations, corresponds to the threshold values or ranges in the sensory map. Adequate correspondence is abbreviated in FIG. 6 by a check mark. If the data communicated via the incoming sensory feedback signals (arrow $S_{FB}$) is acceptable along the progression of states in the successful completion of the grasp, the method 100 returns to step 102 after completing the task commanded at step 102. Otherwise, the method 100 proceeds to step 110.

Part of step 108 may include executing a maintenance mode in which the GUI 25 displays a status of an automatic operation of the robotic gripper 16, including displaying a state of motion of the robotic gripper 16, the grasp pose being executed, and a progression of the grasp pose. A dynamic state of the sensory map may also be displayed in the maintenance mode, possibly including color coding limits of the sensory map via corresponding colors, e.g., with red used to show that certain limits have been exceed, green used to show that performance falls within the corresponding limits, and yellow used to show values approaching the limits.

Step 110 entails executing a control action with respect to the robotic gripper 16. This step could entail, for instance, outputting the control signal (arrow $C_X$) of FIG. 1 to cause execution of a desired control action, such as adjusting the limits of the sensory maps SM1 or SM2 of FIGS. 4 and 5 if the sensory feedback signals (arrow $S_{FB}$) falls outside of the ranges is found to be acceptable, a result that would indicate the original limits were too conservative. The opposite control action could be executed, i.e., adjusting the range limits or thresholds to require a different value if the executed grasp was ineffective, for instance the component 11 was dropped. Here, task execution could be passed to an exception handling routine appropriate to this particular grasp type and context in the task execution sequence, for resolution in automatic mode. Alternatively, during a failure condition power to the robotic gripper 16 could be temporarily interrupted to allow access by a maintenance technician, and/or an alert device could be activated to signal a fault condition. Once the appropriate control action has been taken for the failure condition, the method 100 is finished, resuming at step 102 from the neutral pose 50N of FIG. 3 and step 102 at a subsequent execution.

As will be clear to one of ordinary skill in the art in light of the above disclosure, the system 20 of FIG. 1, when used as described herein, provides a simplified interaction with complex robotic devices, such as a dexterous hand, in a gripper application. The system 20 provides an intuitive, high-level interface for jogging, programming, and using a multi-sensor, multi-axis robotic gripper such as the robotic gripper 16 shown in FIG. 2. A hand task representation is displayed as shown in FIG. 3, with relevant sensor ranges set in a compact data table as shown in FIGS. 4-5. The method 100 of FIG. 6, when used to control the system 20 of FIG. 1, is thus applicable to low and high-function robotic grippers or hands in a wide range of control architectures.

While the best modes for carrying out the invention have been described in detail, those familiar with the art to which this invention relates will recognize various alternative designs and embodiments for practicing the invention within the scope of the appended claims

The invention claimed is:

1. A system comprising:
a robotic gripper having a sensory matrix that includes a plurality of sensors connected to or embedded in the robotic gripper, wherein the robotic gripper is configured to execute, in response to a grasp command signal, a selected one of a plurality of grasp poses with respect to a component; and
a grasp controller in communication with the robotic gripper that is configured to selectively generate the grasp command signal, including;
an interactive, touch screen graphical user interface (GUI) device operable to display a jog wheel having a hub and a circumference about which is displayed the plurality of grasp poses, and to generate a jog signal in response to a received input in the form of a touch gesture in which the user slides a finger from the hub toward one of the plurality of grasp poses; and
tangible, non-transitory memory on which is recorded a sensory map in the form of a data table, wherein the sensory map provides calibrated limits for each sensor contained in the sensory matrix for the selected grasp pose;
wherein the grasp controller transmits the grasp command signal to the robotic gripper in response to receipt of the jog signal from the interactive GUI device to thereby cause the robotic gripper to grasp the component and receives sensory feedback signals from the sensory matrix.

2. The system of claim 1, wherein each of the plurality of grasp poses has a corresponding sensory map stored in the memory of the grasp controller.

3. The system of claim 1, wherein the robotic gripper has a palm and at least one articulated finger, and wherein the sensors are positioned on each of the articulated fingers and the palm.

4. The system of claim 1, wherein the sensors of the sensory matrix include at least one of: a force sensor, a load sensor, a weight sensor, and a temperature sensor.

5. The system of claim 1, wherein the grasp controller is further configured to execute a teach mode in which the sensory matrix is populated via some of the sensory feedback signals derived while the user manually poses or backdrives the robotic gripper.

6. The system of claim 1, wherein the sensory matrix includes at least one external sensor that is not connected to or embedded within the robotic gripper.

7. A method for controlling a robotic gripper having a sensory matrix that includes a plurality of sensors connected to or embedded in the robotic gripper, the method comprising:
displaying, via an interactive graphical user interface (GUI) of a grasp controller for the robotic gripper, a jog wheel having a hub and a circumference about which is displayed a plurality of grasp poses of the robotic gripper;
generating a jog signal via the interactive GUI of the grasp controller in response to an input from a user, wherein the input from the user is a touch gesture in which the user slides a finger from the hub toward a selected one of the plurality of grasp poses;
processing the jog signal via a processor of the grasp controller;
generating a grasp command signal via the grasp controller in response to the jog signal;
executing the selected grasp pose via the robotic gripper with respect to a component in response to the grasp command signal, including grasping the component with the robotic gripper;
receiving sensory feedback signals from the sensory matrix during execution of the selected grasp pose;
comparing the received sensory feedback signals via the grasp controller to a corresponding sensory map in the form of a data table, wherein the at least one sensory map provides calibrated limits for the selected grasp pose for each sensor contained in the sensory matrix; and
executing a control action with respect to the robotic gripper when any of the received sensory feedback signals fall outside of their corresponding calibrated limits.

8. The method of claim 7, wherein the robotic gripper has a palm, at least one finger, and an opposable thumb.

9. The method of claim 8, wherein the at least one finger includes four articulated fingers, and wherein the sensory matrix includes sensors positioned on each of the fingers, the thumb, and the palm.

10. The method of claim 7, wherein receiving sensory feedback signals from the sensory matrix includes receiving at least one force or load sensor signal, a weight sensor signal, and a heat sensor signal.

11. The method of claim 7, further comprising executing a teach mode via the grasp controller, including manually posing or backdriving the robotic gripper and then populating the sensory matrix with values that are derived during the posing or backdriving.

12. The method of claim 7, wherein the grasp controller is in communication with a task controller, further comprising receiving a task command signal from the task controller.

13. The method of claim 7, further comprising: executing a maintenance mode in which the GUI displays a status of an automatic operation of the robotic gripper, including displaying a state of motion of the robotic gripper, the grasp type, and a progression of the grasp pose.

14. The method of claim 13, wherein executing a maintenance mode includes displaying a dynamic state of the sensory map and indicating a condition of limits of the sensory map via corresponding colors.

15. The method of claim 7, wherein receiving sensory feedback signals from the sensory matrix during execution of the selected grasp pose includes receiving sensory feedback from at least one external sensor that is not connected to or embedded within the robotic gripper.

16. A system comprising:
a robotic gripper having a sensory matrix that includes a plurality of sensors connected to or embedded within the robotic gripper, including at least a plurality of force or load sensors, a weight sensor, and a heat sensor, wherein the robotic gripper includes a plurality of articulated fingers, a palm, and an opposable thumb, and is configured to execute a selected one of a plurality of grasp poses in response to a grasp command signal to thereby grasp the component; and
a grasp controller in communication with the robotic gripper and configured to generate the grasp command signal, the grasp controller including:
a touch-screen interactive graphical user interface (GUI) operable to display a jog wheel having a plurality of grasp pose icons arranged around its circumference and a neutral grasp pose icon positioned at its center or hub, wherein the GUI is configured to generate a jog signal in response to an input touch motion from a user;
a processor; and
tangible, non-transitory memory on which is recorded a plurality of different sensory maps in the form of data tables, wherein the sensory maps provide calibrated limits for a corresponding one of the plurality of grasp poses for each sensor contained in the sensory matrix;
wherein the controller transmits the grasp command signal to the robotic gripper in response to receipt of the jog signal from the GUI and receives sensory feedback signals from the sensory matrix to thereby cause the robotic gripper to grasp the component.

17. The system of claim 16, wherein the grasp controller is configured to execute a teach mode in which the sensory matrix is populated via some of the sensory feedback signals derived by manually jogging, posing, or backdriving the robotic gripper.

18. The system of claim 16, wherein the grasp controller is in communication with a task controller, and receives a task command signal from the task controller.

19. The system of claim 16, wherein the sensory matrix also includes a camera.

* * * * *